(12) United States Patent
Johnson

(10) Patent No.: US 6,315,896 B1
(45) Date of Patent: Nov. 13, 2001

(54) DISPOSABLE WASTE COLLECTOR

(76) Inventor: Ronald B. Johnson, 1603 Thomaswood La., Dallas, TX (US) 75253

( * ) Notice: Subject to any disclaimer, the term of this patent is extended or adjusted under 35 U.S.C. 154(b) by 0 days.

(21) Appl. No.: 09/603,319

(22) Filed: Jun. 27, 2000

(51) Int. Cl.$^7$ .............................. B01D 29/27; B01D 35/02
(52) U.S. Cl. ..................... 210/164; 210/452; 210/479; 210/499; 4/291; 4/292
(58) Field of Search ................................. 210/163, 164, 210/452, 473, 474, 477, 479, 499; 4/289, 290, 291, 292

(56) References Cited

U.S. PATENT DOCUMENTS

| | | | |
|---|---|---|---|
| 769,001 | * 8/1904 | Lawrence | 4/291 |
| 852,044 | * 4/1907 | Van Der Minden | 4/291 |
| 1,612,588 | * 12/1926 | La Coste | 4/291 |
| 2,263,259 | * 11/1941 | Boosey | 210/164 |
| 3,713,539 | * 1/1973 | Thompson et al. | 210/164 |
| 3,960,728 | * 6/1976 | Otzen | 4/291 |
| 4,419,232 | * 12/1983 | Arntger et al. | 210/164 |
| 5,575,925 | * 11/1996 | Logue, Jr. | 210/474 |
| 6,086,758 | * 7/2000 | Schilling et al. | 210/164 |
| 6,149,803 | * 11/2000 | DiLoreto et al. | 210/164 |

* cited by examiner

*Primary Examiner*—Christopher Upton
(74) *Attorney, Agent, or Firm*—Jack A. Kanz

(57) ABSTRACT

A disposable waste collector is formed by attaching the open end of a porous tubular bag to a rigid ring. The waste collector is positioned in a drain opening below the entry grate so that all fluids passing through the entry grate must pass through the tubular bag. Solid particles in the fluid stream are trapped in the tubular bag as waste water passes therethrough. The waste collector may be withdrawn and replaced when filled.

7 Claims, 1 Drawing Sheet

DISPOSABLE WASTE COLLECTOR

This invention relates to drain protection. More particularly it relates to methods and apparatus for collecting particles of solid waste at the entry of a gravity drain for easy disposal and thereby protecting the downstream drain from unnecessary clogging.

Gravity-fed drains are commonly used in many places to permit flush cleaning. Floor level gravity drains are employed, for example, in food serving establishments such as hotel and restaurant kitchens so that the kitchen floor may be conveniently flushed with water to maintain sanitation. Such drains typically employ a drain inlet at floor level which is connected to a drain line by a tapered collection cup. The top of the collection cup is covered at floor level with a grate or screen and the bottom of the cup connected to a gravity drain line. Thus water used in washing the floor may drain through the grate and into the drain line. The grate provides a floor surface which has holes to permit water to drain into the drain line.

In many instances, particularly in food service kitchens, the grate is ineffective in separating solid waste from drain water. As a result, a high volume of solid waste particles passes through the grate and into the drain system. Such solid waste particles tend to aggregate and form clogs or plugs which impair or totally stop drain flow. A stopped drain is not only messy and difficult to clean, the plugged drain may (and often does) result in flooding or partial flooding of the kitchen floor with solid and liquid wastes, creating a highly unsanitary and unacceptable condition.

In accordance with the present invention a disposable waste collector is provided which fits in the drain entry below the grate. The disposable collector is in the form of a tubular bag with one open end. The open end is secured to a rigid ring so that the inner diameter of the rigid ring defines the entrance to the tubular bag. The rigid ring is sized to fit within the drain entry below the grate. At least the outer diameter of the rigid ring is larger than the inner diameter of the drain line so that the ring is trapped between the grate and the drain line. The tubular bag depends from the ring and into the drain line so that all fluids passing through the grate must pass into and through the tubular bag. The bag is porous so that water may readily pass therethrough. However, particles of solid matter are trapped in and remain in the bag. When the bag is full, it may be rapidly and easily removed and replaced. Thus solid waste particles which most commonly clog drains are caught in the bag and prevented from accumulating in the drain system. Other features and advantages of the invention will become more readily understood from the following detailed description taken in connection with the appended claims and attached drawing in which:

Figure 1:
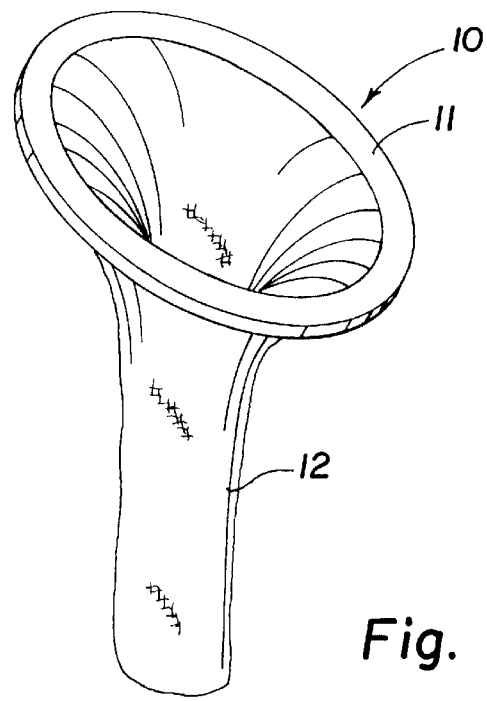
FIG. 1 is a perspective view of the presently preferred embodiment of a disposable waste collector formed in accordance with the invention.

The drawing is incorporated into and forms part of this specification to illustrate exemplary embodiments of the invention. Throughout the drawing like reference numerals designate corresponding elements. It will be recognized that the principles of the invention may be utilized and embodied in many and various forms. In order to demonstrate these principles, the invention is described herein by reference to specific preferred embodiments. The invention, however, is not limited to the specific forms illustrated and described. Furthermore, the invention is not limited to use in connection with floor level drains in kitchens but may find utility in other similar applications.

Figure 2:
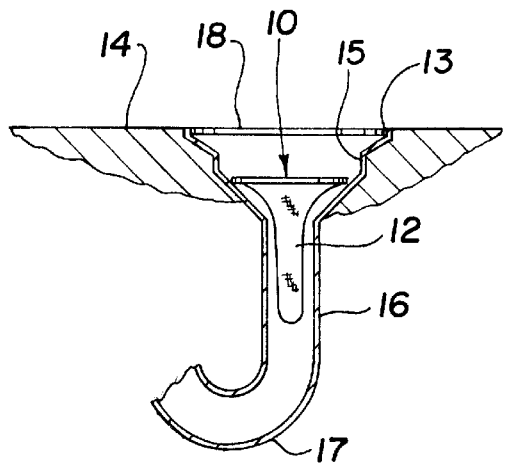
FIG. 2 is a side elevational view, partially in section, of a gravity drain employing a disposable waste collector in accordance with the invention.

As illustrated in FIG. 1 the preferred embodiment of the disposable waste collector 10 comprises a rigid ring 11 to which is attached the open end of a tubular bag 12. The ring 11 should be sufficiently rigid to support the bag 12 within the drain system as illustrated in FIG. 2. Accordingly, the ring may be any rigid or semi-rigid material such as plastic, nylon or the like. In the preferred embodiment the bag 12 comprises a tubular bag formed of elastic knit material. As illustrated in FIG. 1, the diameter of the elastic tube, in its relaxed condition, is less than the diameter of the ring 11. However, the elastic bag should be capable of stretching to a diameter almost that of the ring 11.

Installation of the disposable waste collector in a typical floor drain is illustrated in FIG. 2. The floor drain comprises an opening 13 in floor 14 into which is fitted a conical collector 15 which is connected to a drain line 16. Drain line 16 typically includes a U-shaped trap 17 and is connected to a waste water collection system such as a sewer or the like through outlet 20.

Opening 13 is ordinarily covered with a grate 18 which has apertures 19 therein. Grate 18 is secured in and on the top edge of collector 15 preferably parallel with the top of floor 14 to provide a floor support surface through which fluids may pass into the collector 15.

Solid waste particles large enough to pass through apertures 19 in grate 18 ordinarily flow through the drain line 16 and trap 17 into the sewer collection system without difficulty. However, when the concentration of solid particles is exceptionally high or such particles are exceptionally cohesive (such as greasy food particles from a commercial kitchen, etc.), some of the solid materials may pass through grate 18 in sufficient quantities to accumulate and form a plug in drain line 16, trap 17 or outlet line 20. Such plugs can be extremely difficult and messy to remove and may cause flooding of the floor 14. Resulting in highly unsanitary conditions on floor 14.

In accordance with the invention grate 18 is temporarily removed and a disposable waste collector 10 as illustrated in FIG. 1 is inserted into the drain opening as illustrated in FIG. 2. The grate 18 is then replaced. As illustrated in FIG. 2, the outer diameter of ring 11 must be larger than the inner diameter of drain line 16 in order to prevent the disposable waste collector 10 from passing completely into drain line 16. However, since drain line 16 is usually circular in cross section, the outer diameter of ring 11 need only be slightly larger than the inner diameter of drain line 16.

Where the drain opening is defined by a conical collector (as shown in FIG. 2) the ring 11 simply nests on the sidewalls of collector 15 with bag 12 extending into line 16. When grate 18 is replaced, the disposable waste collector 10 is securely trapped within the drain in position to guarantee that all liquids passing through grate 18 must pass through bag 12.

In the preferred embodiment bag 12 is a knitted elastic fabric. Accordingly, the diameter of bag 12 in the relaxed condition is less than the diameter of ring 11. When the lower end of bag 12 is inserted into drain line 16 and liquid flushed through the grate 18, the bag 12 draws the ring 11 snugly against the sides of conical collector 15.

It will be recognized that all drains do not have the configuration shown in FIG. 2. Nevertheless, regardless of configuration of the drain, there is usually enough space below the grate 18 to allow insertion of a disposable waste collector 10 in such a manner that all fluids passing through the grate must pass through the bag 12.

Once the grate 18 is replaced, the presence of disposable waste collector 10 is not visibly discernible. However, all liquid wastes must pass through the bag 12. Since the bag 12 is porous, water flows directly through the bag and into grease trap 17. However, particles of solid materials are trapped within the bag 20. Furthermore, as solid materials collects within bag 12, bag 12 stretches downwardly into drain line 16.

It will be recognized that when sufficient solid materials is trapped within disposable waste collector 10, the bag may be extended sufficiently to retard flow through the drain line 16. However, when the bag reaches it capacity, it should be removed and replaced.

Figure 3:
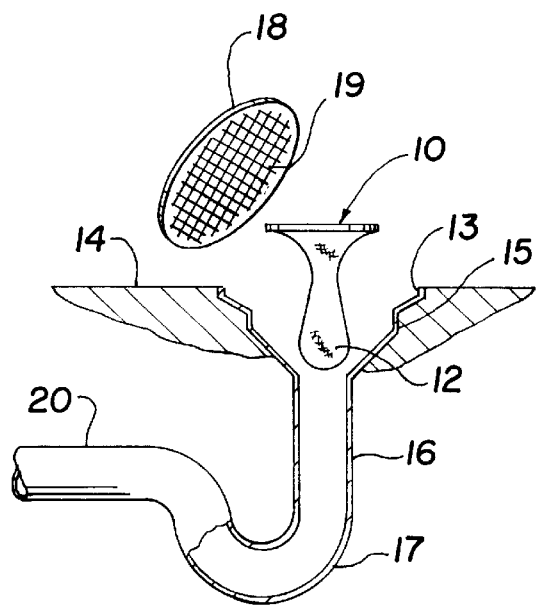
FIG. 3 is a side elevational view, partially in section, of a gravity drain illustrating removal of a disposable waste collector in accordance with the invention.

As illustrated in FIG. 3 the bag 12 may stretch substantially when filled with solid waste. However, the collection of solid waste may be easily removed by removing grate 18 and withdrawing disposable collector 10 from the drain line 16. All solid materials trapped within bag 12 is thus removed from the system and prevented from forming clogs further within the drain lines 16, 17 or 20. The waste collector 10 may be emptied and washed for reuse or may be simply discarded.

The size of the pores in the fabric from which bag 12 is formed will, of course, determine the filtration effect achieved. In the preferred embodiment, the bag 12 is made from a knitted elastic fabric which stretches when filled with solid wastes. Since the bag stretches, the pore size of the fabric may vary somewhat but, as solid materials collect in the lower end of the bag to cause stretching, the upper end of the bag remains unobstructed to permit flow of water therethrough.

The bag 12 may be made from any material which acts as a sieve to collect solid particles from flowing water. The size of the pores will, of course, determine the effectiveness of filtration. However, too fine a mesh may restrict water flow. A fine mesh knit fabric made of natural or synthetic fibers such as nylon, spandex, etc., may be used. It is preferred that the bag be somewhat elastic. Bags made of nylon and spandex knit fabrics such as commonly used in manufacturing ladies' hosiery have been found most effective sieves for restaurant drains and exhibit the preferred degree of stretch. Other fabrics may be more suitable for other applications.

The composition and shape of the support ring 11 is not particularly critical. The ring should be sufficiently rigid to maintain the mouth of the bag 12 open and prevent the bag 12 from begin drawn into the drain outlet line The ring 12 is preferably a circular ring of plastic, polyethylene or the like. Since most drain outlets are circular in cross section, the ring 11 is preferably circular. However, any other shape which will fit between the grate and the drain outlet line while holding the mouth of the bag 12 open sufficiently to insure that most waste passing through the grate must enter the bag is acceptable.

Waste collectors as described above have been found extremely effective in separating solid wastes from waste water passing through gravity-fed drains The sieves of the invention may be made from various commonly available materials, synthetic as well as natural, which will satisfy the essentials of the invention. It is also to be understood, however, that even though numerous characteristics and advantages of the invention have been set forth in the foregoing description together with details of the structure and function of various embodiments, this disclosure is to be considered illustrative only. Various changes and modifications may be made in detail, especially in matters of shape, size, arrangement and combination of parts, without departing from the spirit and scope of the invention as defined by the appended claims.

What is claimed:

1. For use in a gravity drain having an entry, an entry grate, a drain outlet and a collector connecting the entry to the drain outlet, a disposable waste collector comprising:
   (a) a rigid ring having an outer diameter larger than the inner diameter of the drain outlet; and
   (b) a porous tubular elastic bag having an open end secured to and supported by said rigid ring so that the inner diameter of said rigid ring defines the entry to said open end.

2. A waste collector as defined in claim 1 wherein said porous tubular bag is made of knitted fabric.

3. A waste collector as defined in claim 1 wherein the diameter of said porous tubular elastic bag, in the relaxed condition, is less than the inner diameter of said rigid ring.

4. A disposable drain sieve comprising:
   (a) a rigid support ring having an internal diameter and an external diameter; and
   (b) a porous tubular bag having a closed end and an open end wherein:
      (i) said porous tubular bag is elastic;
      (ii) the diameter of the porous tubular bag in the relaxed condition is less than the internal diameter of said support ring; and
      (iii)) the open end of said porous tubular bag is secured to and supported by said support ring so that the inner diameter of said support ring define the entrance to the tubular bag.

5. A disposable drain sieve defined in claim 4 wherein the elastic material is a fabric made of knitted fibers.

6. In combination:
   (a) a gravity drain including:
      (i) a drain entry having a first diameter;
      (ii) a drain outlet line having an internal diameter which is less than said first diameter; and
      (iii) a grate positioned over the drain entry; and
   (b) a disposable drain sieve comprising:
      (i) a rigid support ring having an external diameter smaller than said first diameter and larger than the diameter of said outlet line positioned between said grate and said outlet line;
      (ii) a porous tubular elastic bag having a closed end which depends into said drain outlet line and an open end secured to and supported by said rigid ring so that the internal diameter of said rigid ring defines the entrance to said porous tubular bag.

7. The combination set forth in claim 6 wherein said porous tubular bag is made of elastic fabric.

* * * * *

UNITED STATES PATENT AND TRADEMARK OFFICE
CERTIFICATE OF CORRECTION

PATENT NO. : 6,315,896 B1
DATED : November 13, 2001
INVENTOR(S) : Johnson

It is certified that error appears in the above-identified patent and that said Letters Patent is hereby corrected as shown below:

Column 2,
Line 41, should read -- flooding of the floor 14, resulting in highly unsanitary conditions on floor 14 --.

Signed and Sealed this

Twenty-eighth Day of May, 2002

Attest:

JAMES E. ROGAN
Attesting Officer
*Director of the United States Patent and Trademark Office*